(12) United States Patent
Sugar et al.

(10) Patent No.: US 6,526,264 B2
(45) Date of Patent: Feb. 25, 2003

(54) WIDEBAND MULTI-PROTOCOL WIRELESS RADIO TRANSCEIVER SYSTEM

(75) Inventors: Gary L. Sugar, Rockville, MD (US); William R. Seed, N. Potomac, MD (US)

(73) Assignee: Cognio, Inc., Gaithersburg, MD (US)

( * ) Notice: Subject to any disclaimer, the term of this patent is extended or adjusted under 35 U.S.C. 154(b) by 0 days.

(21) Appl. No.: 09/984,166

(22) Filed: Oct. 29, 2001

(65) Prior Publication Data
US 2002/0080728 A1 Jun. 27, 2002

Related U.S. Application Data
(60) Provisional application No. 60/245,468, filed on Nov. 3, 2000.

(51) Int. Cl.[7] .............................. H04B 1/40; H04J 1/16
(52) U.S. Cl. .......................... 455/84; 455/69; 455/78; 455/522; 370/252; 370/466
(58) Field of Search ............................ 370/311, 321, 370/336, 347, 252, 370, 466, 442; 375/295, 296, 297, 219; 455/69, 41, 84, 522, 73, 76, 78, 82, 83, 324

(56) References Cited

U.S. PATENT DOCUMENTS

| 5,768,268 A | 6/1998 | Kline et al. |
| 5,889,772 A | 3/1999 | Fischer et al. |
| 5,923,761 A | 7/1999 | Lodenius |
| 6,370,109 B1 * | 4/2002 | Schwartz et al. ........... 455/522 |
| 6,400,774 B1 * | 6/2002 | Matsuoka et al. .......... 375/295 |
| 6,400,775 B1 * | 6/2002 | Gourgue et al. ............ 375/296 |
| 2001/0010689 A1 | 8/2001 | Awater et al. |

FOREIGN PATENT DOCUMENTS

| WO | WO0124455 A1 | 4/2001 |
| WO | WO0124456 A1 | 4/2001 |
| WO | WO0124457 A1 | 4/2001 |
| WO | WO0124458 A1 | 4/2001 |
| WO | WO0124454 A1 | 5/2001 |
| WO | WO0135540 A2 | 5/2001 |
| WO | WO0135578 A1 | 5/2001 |

OTHER PUBLICATIONS

TrueRadio, Enabling Wi–Fi and Bluetooth Coexistence without Comprise, Mobilian True Connectivity.

* cited by examiner

Primary Examiner—Nay Maung
(74) Attorney, Agent, or Firm—D. Andrew Floam

(57) ABSTRACT

A wideband radio transceiver system that features a wideband RF section and a flexible and scalable baseband signal processing section. The transceiver system architecture has configurable baseband processing to process signals for multiple communication protocol standards, or multiple instances of the same communication protocol standard, that operate over the same frequency band. Optional additional features include a transmit carrier suppressor and transmit interference canceller to suppress the effects of a transmit signal on receive signal processing when signals are being transmitted and received simultaneously.

29 Claims, 6 Drawing Sheets

WIDEBAND MULTI-PROTOCOL WIRELESS RADIO TRANSCEIVER SYSTEM

This application claims priority to U.S. Provisional Application No. 60/245,468 filed Nov. 3, 2000, the entirety of which is incorporated herein by reference.

BACKGROUND OF THE INVENTION

The present invention is directed to a radio transceiver system architecture useful in communication devices operating in a wireless local area network (WLAN) and/or a wireless personal area network (WPAN). The term WLAN is used to refer to a class of wireless communication technology that operates at a distance up to 100 meters, and WPAN is commonly used to refer to a class of wireless communication technology that operates up to a distance of 10 meters. For simplicity, when used herein, the term WLAN is meant to encompass WLAN as well as WPAN technologies, and any other shorter-range wireless communication technology, particularly, but not limited to, those that do not require a license for operation by the Federal Communications Commission in the United States and other similar unlicensed bands outside of the U.S.

Generally, the unlicensed bands are at 2.4 GHz and 5 GHz. The 5 GHz unlicensed band consists of band segments that are not contiguous, whereas the 2.4 GHz unlicensed band is a single contiguous frequency band. As shown in the chart below, certain applications are served in particular unlicensed bands, depending on the application. Moreover, certain wireless communication technologies are used in the various bands.

Conventional practice is to design a radio transceiver targeted to the point solutions they are to be used in. For example, a radio transceiver to be used in a device that operates using the Bluetooth™ communication protocol is sized and customized to the Bluetooth protocol. Generally the same can be said for radio transceivers designed for use in devices that operate using the IEEE 802.11 communication protocol. However, there is a trend in which many applications of WLANs require that a communication device operate multiple communication protocol technologies, or operate multiple instances of the same communication protocol technology. For example, a computer laptop device may operate both 802.11 and Bluetooth.

| Wireless Technology | Primary Markets | Max Data Rate | Range (feet) | ISM Band (GHz) | Modulation |
|---|---|---|---|---|---|
| 802.11/DS | Enterprise, school | 2 Mbps | 150 | 2.4 | DS/QPSK |
| 802.11/FH | Enterprise, school | 2 Mbps | 150 | 2.4 | FH/FSK |
| 802.11b | Enterprise, school, Public Access | 11 Mbps | 150 | 2.4 | DS/CCK |
| 802.11a | Enterprise, school, Public Access | 54 Mbps | 75 | 5 | OFDM/QAM, /PSK |
| OpenAir | Enterprise, school | 1.6 Mbps | 500 | 2.4 | FH |
| HiperLAN1 | Enterprise, school, Public Access | 24 Mbps | 150 | 5 | OFDM |
| HiperLAN2 | Enterprise, school, Public Access | 54 Mbps | 75 | 5 | OFDM/QAM, /PSK |
| Bluetooth | Wireless cable, handsets, handelds | 721 kbps | 30 | 2.4 | FH/FSK |
| HomeRF | Home | 1.6 Mbps | 150 | 2.4 | FH/FSK |
| HomeRFWB | Home, school | 10 Mbps | 150 | 2.4 | FH/FSK |

Consequently, it is desirable to provide a radio transceiver system architecture that can be used for one or more communication protocol technologies in a flexible and scalable manner.

SUMMARY OF THE INVENTION

The present invention is directed to a wideband transceiver system architecture that features a shared radio frequency (RF) hardware section and a scalable baseband signal processing section. Baseband signal processing may be implemented with hardware, a digital signal processor (DSP), a field-programmable gate array (FPGA) or one or more application specific ICs (ASICS) allowing it to be readily configurable for different communication protocol standards. A radio architecture with configurable baseband processing allows multiple standards that operate over the same frequency band to share the same radio hardware implementation. A new standard can be supported by implementing the required additional firmware functionality in the baseband processing sections.

A configurable radio approach to the implementation of multiple technologies that share a common frequency band enables a lower cost solution by reducing the number of integrated circuits and additional filters and other passive components that would otherwise be required for implementations that use multiple separate chipsets for each technology. The implementation of the present invention enables chipset developers to benefit from IC cost reductions associated with reductions in digital CMOS IC geometry.

Other objects and advantages of the present invention will become more readily apparent when reference is made to the following description in conjunction with the accompanying drawings.

DETAILED DESCRIPTION OF THE INVENTION

Figure 1:
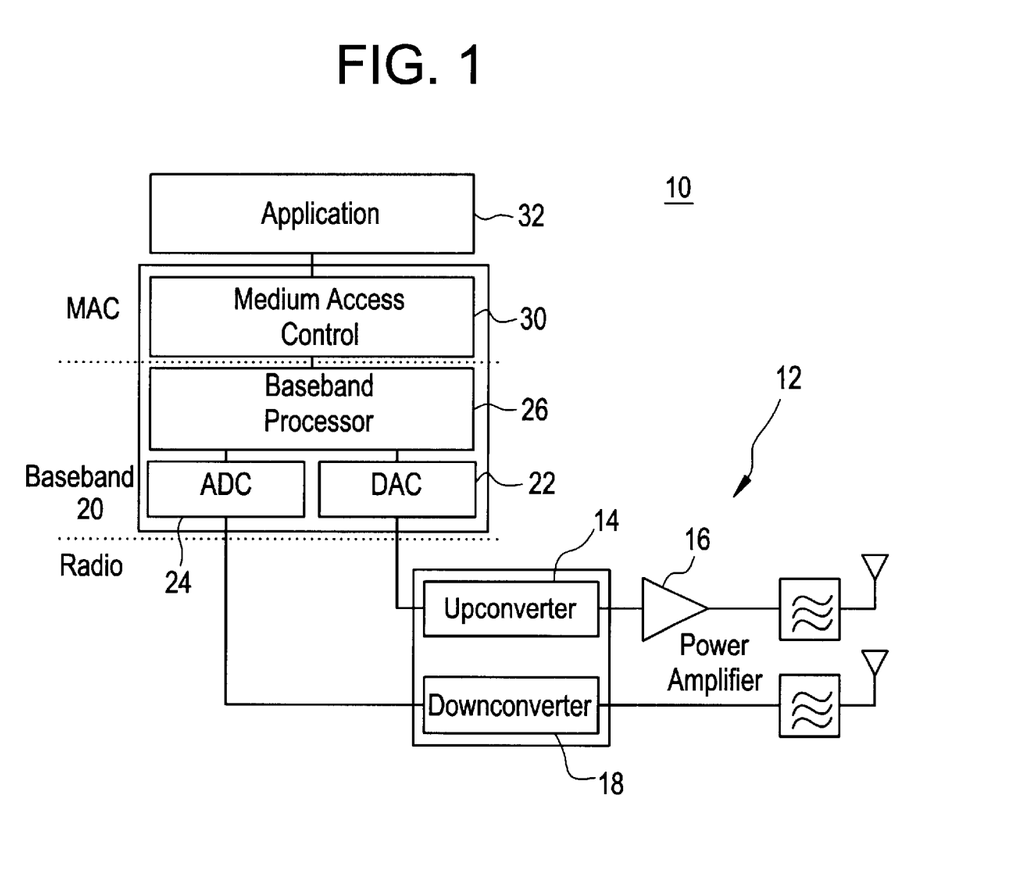
FIG. 1 is a block diagram of a wideband transceiver system architecture according to the present invention.

A general diagram of the wideband transceiver 10 is shown in FIG. 1. The RF hardware 12 consists of a generic upconverter 14 that converts a baseband or low intermediate frequency (IF) signal to the transmit frequency band, a power amplifier (PA) 16 which amplifies the upconverted signal to a desired output level, and a generic downconverter 18 which converts the received RF signal to baseband or a low IF. A baseband processing section 20 includes a digital-to-analog converter 22 for analog conversion of the transmit signal, an analog-to-digital converter 24 for digitizing the received baseband or low IF signal, and configurable baseband processing firmware 26.

The baseband signal processing section 20 may be implemented with configurable firmware or software (e.g., a DSP, FPGA or other programming processor) which enables chipset developers to more rapidly implement new features of existing standards. This is frequently referred to in the art as a "software" radio. For example, consider the case of a standard that incorporates a new physical layer implementation in the same frequency band. No changes are required to the RF hardware; the new feature is supported by providing additional firmware in the baseband processing section. The baseband processing section 20 is coupled to a medium access control (MAC) section or layer 30, which in turn couples to an application section or layer 32.

The RF hardware is capable of processing signals over the entire band of operation, thereby enabling chipset scalability. For example, multiple channels of a similar technology may be supported by enhancing only the baseband processing firmware. Similarly, different technologies that share the same frequency band may be supported through enhancement of the same baseband processing firmware. Such an approach is significantly less expensive in terms of cost and development time than having to replicate the entire baseband processing and RF hardware blocks for each additional channel and/or technology to be supported.

Figure 2:
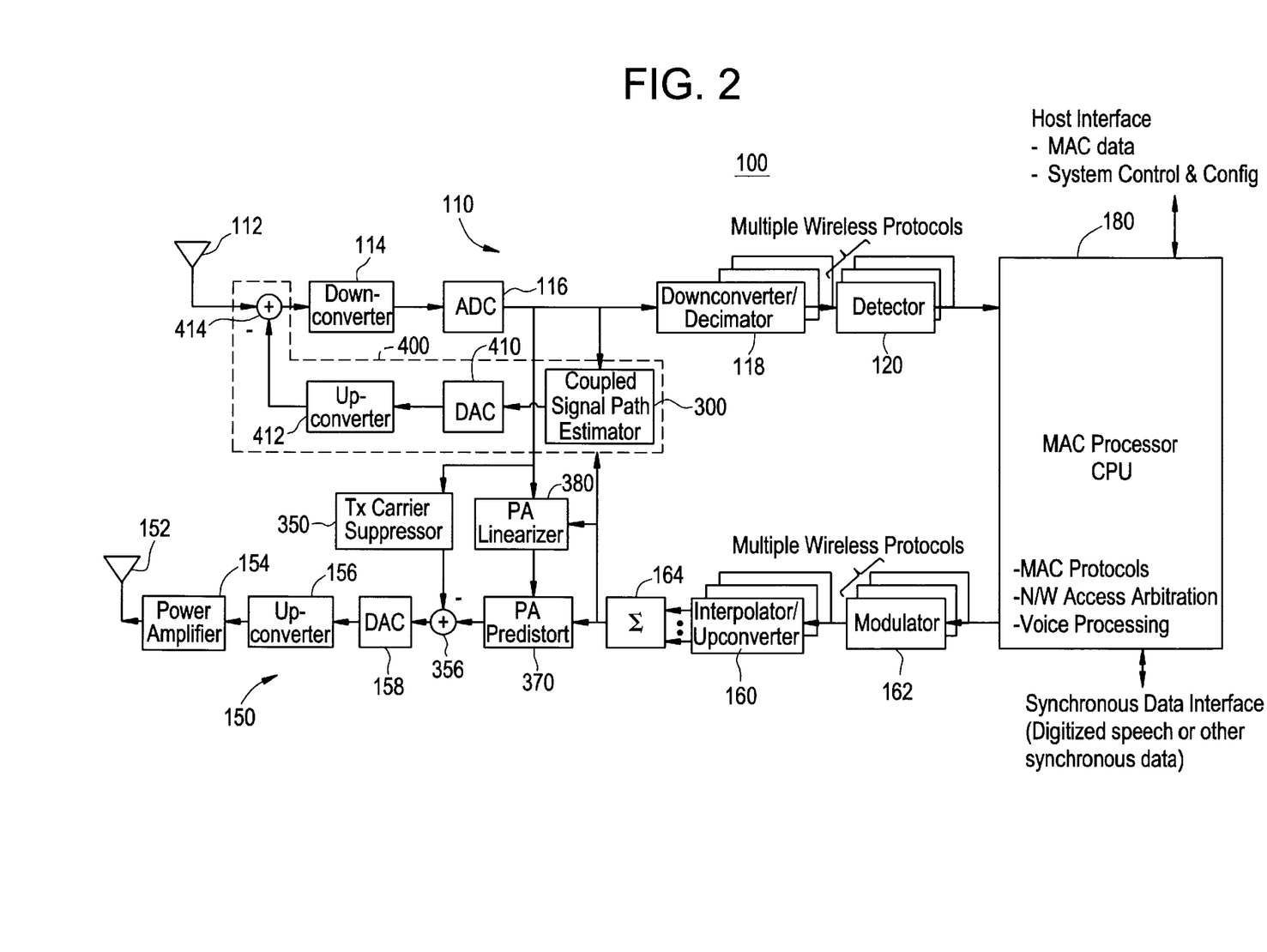
FIG. 2 is a detailed block diagram of a wideband transceiver system according to one embodiment of the present invention.
Figure 3:
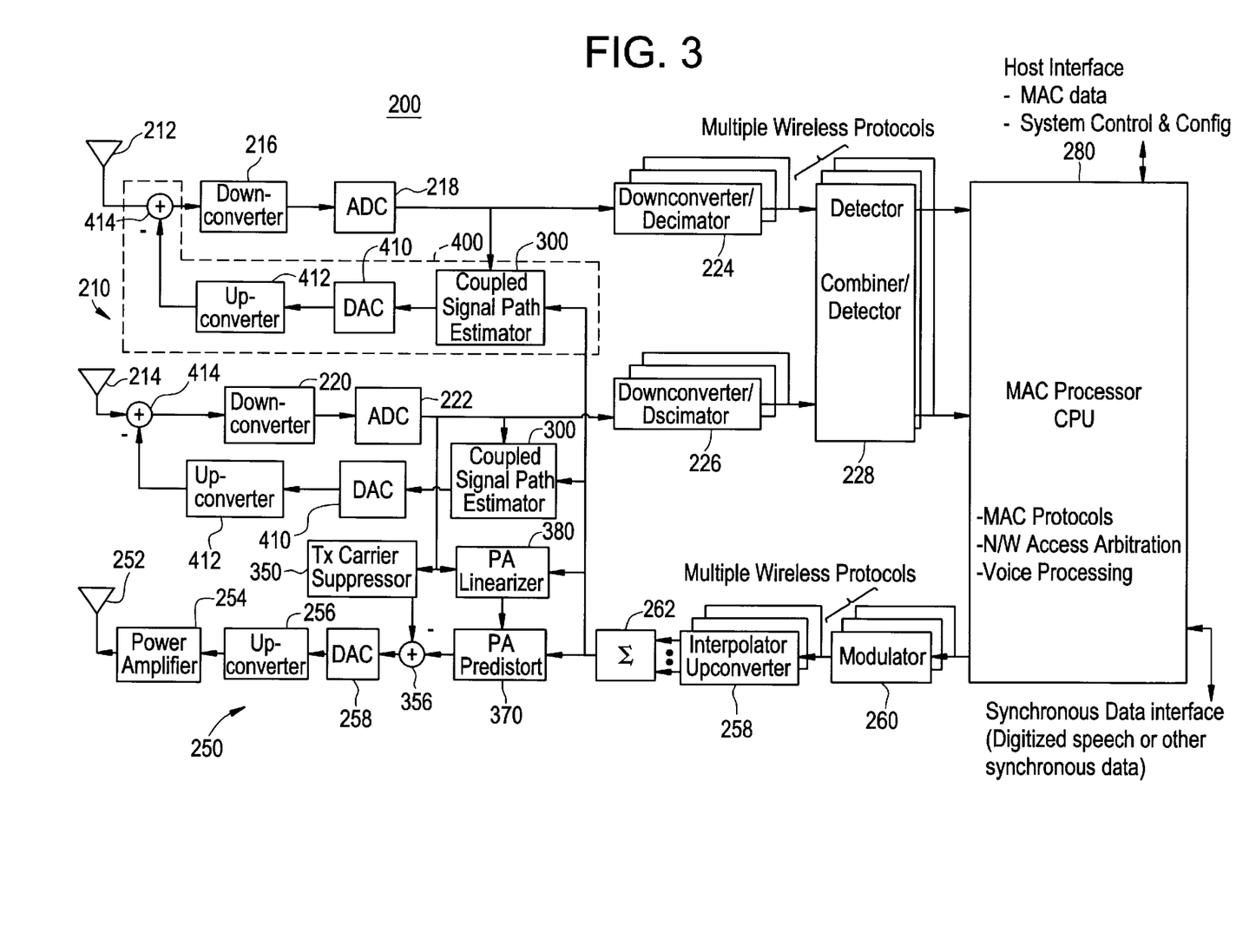
FIG. 3 is a detailed block diagram of a wideband transceiver system according to another embodiment of the present invention.

A block diagram of the wideband radio transceiver system architecture using a single receive antenna is shown in FIG. 2. A dual-receive antenna embodiment is shown in FIG. 3. The following describes how the wideband architecture is used to process multiple WLAN protocols such as Bluetooth, HomeRF and IEEE 802.11 in the 2.4 GHz ISM band.

These techniques are discussed in the context of a particular set of protocols operating over a particular frequency band; however, the techniques described in this section may be applied more broadly to process communication protocol signals over other frequency bands. There are several independently unique features of the wideband architecture described herein as will become apparent from the description with reference to the diagrams.

The wideband radio transceiver system architecture of FIG. 2 is first described. The system, generally identified by reference numeral 100, comprises a receive signal path 110 and a transmit signal path 150. The receive signal path 110 comprises a receive antenna 112, a downconverter 114, an analog-to-digital converter (ADC) 116, a downconverter/decimator bank 118 and detector bank 120. The number and type of downconverter/decimators in the downconverter/decimator bank 118 and of the detectors in the detector bank 120 depends on the number and type of communication protocols that the radio system 100 implements. There is a downconverter, a decimator and a detector for each communication protocol because each protocol may require unique downconversion, data rates and detection schemes. The outputs of the detector bank 120 are coupled to a MAC processor/CPU 180. The MAC processor/CPU 180 performs all of the necessary MAC protocol processing, voice (synchronous data) processing, network access arbitration, etc. The MAC processor/CPU 180 interfaces with a host device to exchange MAC data and system control and configuration data, and interfaces with a synchronous data interface to exchange digitized voice or other synchronous data, such as music or video. The MAC processor/CPU 180 may also act as the control processor for the receive signal path section and transmit signal path section, such as providing control signals to the interpolator/upconverter bank in the transmit signal path section to deal with the frequency hopping nature of a communication protocol, as well as for processing information used in optional enhancement functions described hereinafter in conjunction with FIG. 6.

The transmit signal path 150 comprises a transmit antenna 152, a power amplifier 154, an upconverter 156, a digital-to-analog converter (DAC) 158, an interpolator/upconverter bank 160 and a modulator bank 162. The number and type of interpolators and upconverters in the interpolator/upconverter bank 160 and modulators in the modulator block 162 depends on the number and type of communication protocols that the radio system 100 implements, as explained above for the downconverter/decimator bank 118 and detector bank 120. Again, each protocol may require unique interpolation, upconversion and modulation. The outputs of each of the interpolators/upconverter 160 are added together by a summer 164.

Referring to FIG. 3, the wideband radio transceiver system architecture is identified by reference numeral 200. The radio system architecture 200 is a dual-receive antenna architecture comprising a dual signal receive path 210 and a transmit signal path 250. The dual signal receive path 210 comprises a first receive antenna 212 and a second receive antenna 214 associated with first and second receive signal paths. The receive antennas 212 and 214 are physically separated to enable the benefits of spatial diversity under Rayleigh fading conditions to be achieved, which is equivalent to minimizing the correlation between the receive signals. Associated with the first receive antenna 212 is a downconverter 216 and an ADC 218, and associated with the second receive antenna 214 is a downconverter 220 and an ADC 222. The ADC 218 is coupled to a first downconverter/decimator bank 224 and the ADC 222 is coupled to a second downconverter/decimator bank 226. The downconverters/decimators in bank 224 are the same as those in bank 226; they operate on the signals received by the different receive antennas. A combiner/detector bank 228 comprising a plurality of combiners and detectors is coupled to the first and second downconverter/decimator blocks 224 and 226.

The transmit signal path 250 comprises a transmit antenna 252, an upconverter 254, a DAC 256, a plurality of interpolators/upconverters 258 and a plurality of modulators 260. The output of the interpolators/upconverters 258 is added by a summer 262. The MAC processor/CPU 280 is similar to the MAC processor/CPU 180 shown in FIG. 2.

To maximize isolation between the transmit and receive signal paths, the transmit antenna and receive antenna(s) in the system architectures of FIGS. 2 and 3 are sufficiently spatially separated by a distance (relative to the wavelengths of signals in the frequency band) sufficient to achieve attenuation/suppression of the transmit signal in the receive signal path (particularly when the transceiver is transmitting and receiving signals at the same time). Providing this separation reduces the required dynamic range of the receiver. Polarization of the respective transmit and receive antennas also helps to suppress the transmit signal coupled to the receive signal path.

In FIGS. 2 and 3, there are additional optional elements that have not yet been referenced. There is a coupled signal path estimator 300, a transmit carrier suppressor 350, a power amplifier (PA) predistorter 370 and a PA linearizer 380. The coupled signal path estimator 300 is part of a transmit interference canceller 400 that comprises a DAC 410, upconverter 412 and an adder 414. The function of these elements will be described hereinafter. Also, FIGS. 2 and 3 show certain elements as being combined together, such as the downconverter/decimator bank 118; however, these elements may be separate, such as a downconverter bank and a decimator bank.

The wideband radio transceiver system architectures shown in FIGS. 2 and 3 employ a predominantly digital software/firmware implementation. That is, the RF hardware, such as the adder 414, downconverter 114 (downconverter 216), upconverter 412, power amplifier 154 (power amplifier 254), upconverter 156 (upconverter 256) are implemented with analog RF hardware designs, but are designed to operate over the entire frequency band of operation, thereby enabling chipset scalability. The remaining elements are implemented using one or more digital application specific and/or general purpose CPUs or processors, that reside on or more physical chips, that execute firmware or software, respectively, to process signals as required by each communication protocol.

An advantage of the system architectures shown in FIGS. 2 and 3 is that a particular wireless communication device can easily be customized or modified to handle a particular set of communication protocols or standards. The software or firmware for the desired communication protocol is incorporated into the downconverter/decimator bank and detector bank in the receive signal path section, and likewise in the interpolator/upconverter bank and modulator bank in the transmit signal path section. Again, this provides great scalability and flexibility to the design and deployment of communication devices having multiple protocol capability. Thus, significant components of the radio transceiver system may be embodied as a software product stored on a processor readable memory containing instructions that, when executed by a processor, causes the processor to perform the various processing steps required.

Figure 4:
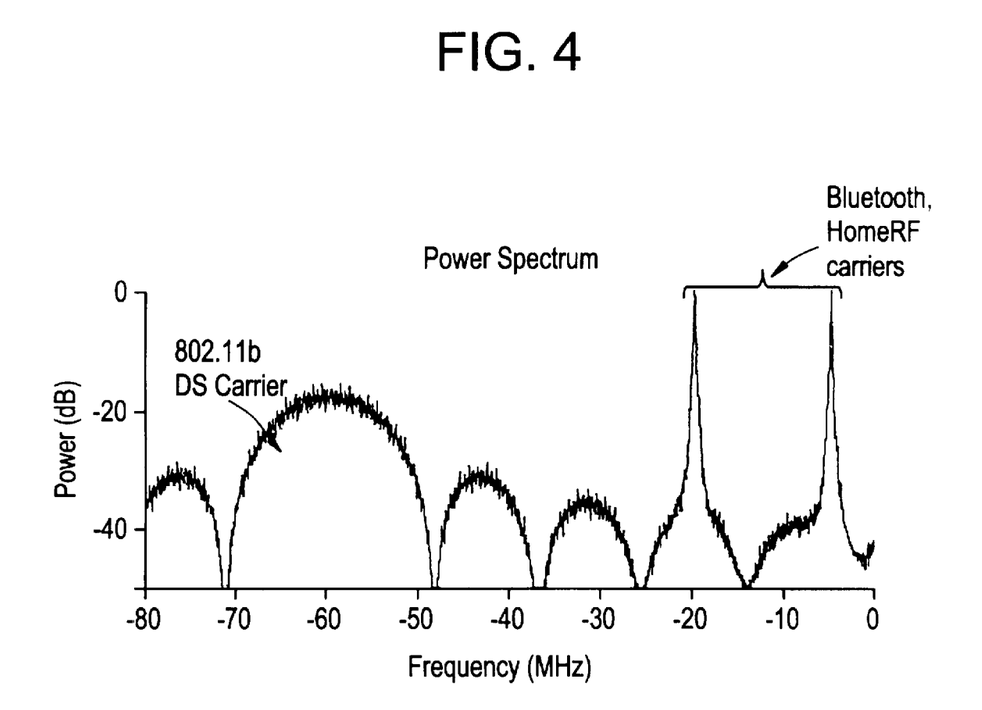
FIG. 4 is a graphical diagram showing an example of the spectrum of the frequency band that is processed by the wideband transceiver system according to the present invention.

FIG. 4 shows an example of the spectrum over a brief interval of time at the ADC input and DAC outputs for 802.11b, Bluetooth and HomeRF signals. In this example, there is a 802.11 signal centered at −60 MHz, a Bluetooth signal centered at −20 MHz and a HomeRF signal centered at −5 MHz.

The basic operation of the radio systems shown in FIGS. 2 and 3 will be described. The signal from the receive antenna path is downconverted to an appropriate receive IF, filtered to remove signals outside the ISM band, and then digitized using a high-speed analog-to-digital converter. In the system of FIG. 2, this involves the receive antenna 112, the downconverter 114 and the ADC 116. In the radio system of FIG. 3, this involves the signals from each of the receive antennas 212 and 214, one of which is processed by the downconverter 218 and ADC 218, and another of which is processed by downconverter 220 and ADC 222. In one embodiment of this system, the downconverter used is a zero-IF quadrature downconverter followed by a lowpass filter. The ADC is, for example, a dual-channel ADC generating at least 80 million complex samples per second in order to prevent aliasing when digitizing the 80 MHz ISM band. In another embodiment, the downconverter performs real signal downconversion to an IF of at least 40 MHz and the ADC is a single-channel ADC operating at a sampling rate of at least 160 MHz.

Prior to downconversion, the optional transmit interference canceller 370 may be used to subtract a replica of the transmit signal from the receive signal path in order to minimize the dynamic range required of the receiver. A more detailed description of the transmit interference canceller is provided hereinafter in conjunction with FIG. 6.

The ADC output signal is fed into the downconverter/decimator bank which converts each of the desired receive signals (associated with one or more communication protocols) in the sampled band to its complex baseband representation. In the downconverter/decimator bank, the baseband signal is lowpass filtered to remove out-of-band energy, and decimated to a convenient sampling rate for a corresponding communication protocol. For frequency-hopped modulation schemes such as Bluetooth and HomeRF, the operating frequency of the digital downconverter is updated periodically to coincide with changes to the carrier frequency. The hop frequency update rate for Bluetooth is 1600 Hz and for HomeRF the update rate is 50 Hz. In FIG. 2, this involves the downconverter/decimator bank 118, and in FIG. 3, this involves the downconverter/decimator bank 224 and downconverter/decimator bank 226, that operate on signals from the receive paths of antennas 212 and 214, respectively.

The decimated baseband signals are provided as an input to a bank of detectors that demodulate the receive signals and recover corresponding data. In FIG. 2, this involves the detector bank 120. For Bluetooth and HomeRF signals, for example, the detector is a complex FM discriminator followed by a two or four-level slicer. For 11 Mbps 802.11b signals, the detector may be a RAKE receiver followed by an array of complimentary code keying (CCK) decorrelators, and optionally by a Viterbi decoder if convolutional coding is enabled.

Figure 5:
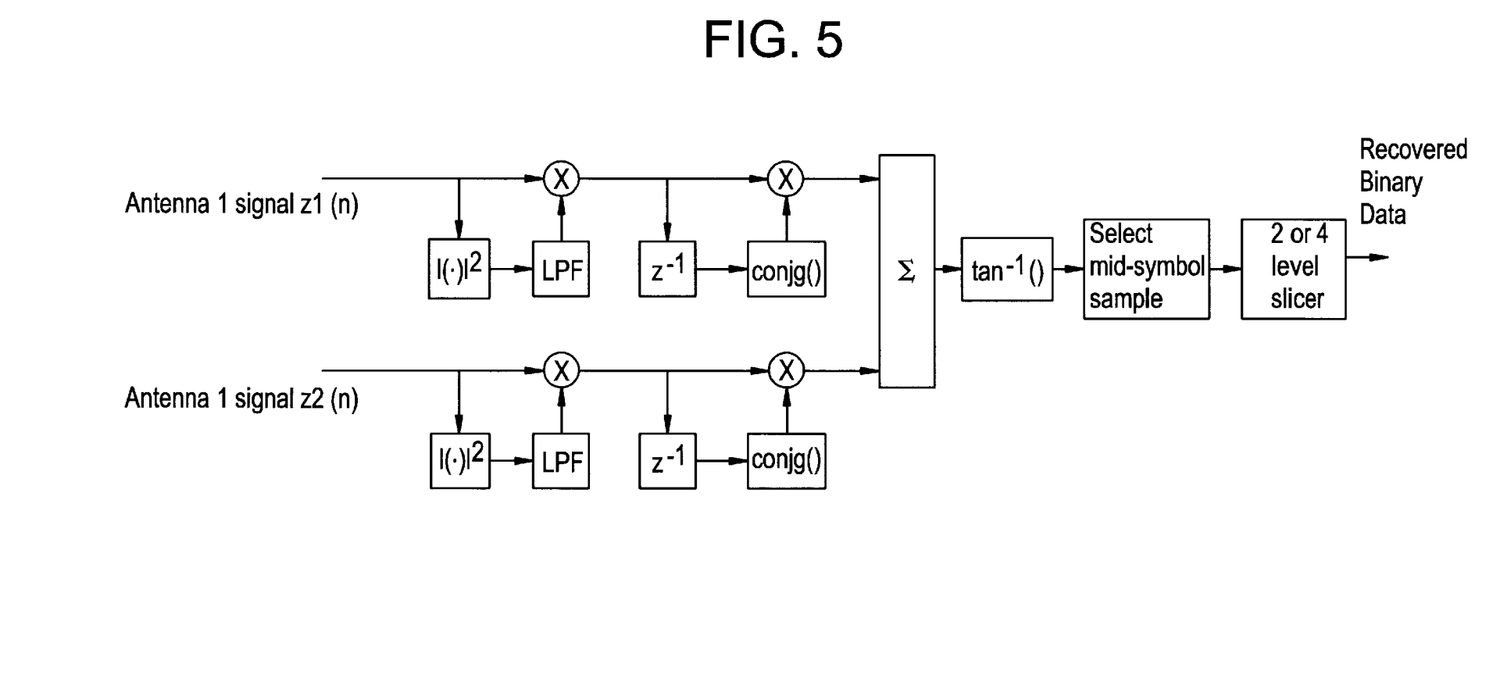
FIG. 5 is a block diagram of an exemplary detector useful for frequency hopping communication protocol signals.

In the two-path diversity system shown in FIG. 3, a joint combiner/detector bank 228 combines the two signals from each antenna path to recover the transmitted data. The combiner/detector used for Bluetooth and HomeRF, for example, is a differentially-coherent maximal-ratio combiner/FM discriminator as shown in FIG. 5, followed by a two or four-level slicer. The 802.11b combiner/detector uses a 2-path RAKE receiver to co-phase, weight and sum the fingers from both receive antennas. The combined signal is then provided as an input to a CCK decorrelator. The recovered receive data is passed from the detector to the CPU for further processing at the MAC layer. Other implementations for the detectors for particular communication protocols are well known in the art.

When transmitting information, data from the MAC processor/CPU is fed into a bank of baseband modulators (one for each time/frequency channel of each supported protocol) which maps the data onto complex baseband signals using the appropriate modulation protocols. In the system of FIG. 2, this involves the modulator bank 162, and in the system of FIG. 3, this involves the modulator bank 260. For Bluetooth and HomeRF, for example, the modulator is a gaussian lowpass filter followed by a complex FM modulator running at sampling rates of 8 and 6.4 MHz, respectively. For 11 Mbps 802.11b DS, the data is mapped onto complex QPSK symbols using CCK, and then square-root raised cosine lowpass filtered at a sampling rate of 44 MHz. Other implementations for the modulators for particular communication protocols are well known in the art.

The modulator outputs are fed into a bank of interpolators that increase the sampling rates of the modulated baseband waveforms to that of the transmit DAC.

The interpolator outputs are then upconverted to an appropriate IF frequency at the desired offset position within the ISM band. This involves the interpolator/upconverter bank 160 in the system of FIG. 2 and the interpolator/upconverter bank 258 in the system of FIG. 3. In one embodiment of this system which covers an 80 MHz frequency band, complex upconversion is used with a 0 Hz IF, followed by a dual-channel transmit DAC generating at least 320 million complex samples per second. Another embodiment uses quadrature upconversion, a transmit IF of at least 40 MHz, and a single-channel transmit DAC running at a sampling rate of at least 160 MHz, for the same 80 MHz frequency band.

The outputs from each of the upconverters is summed by the summer 164 and applied to an optional PA linearizer and PA predistortion process in order to compensate for non-linear distortion generated by the PA. A more detailed discussion of the PA linearization process is described hereinafter. If linearization is employed, the pre-distorted output samples are fed to the transmit DAC, the output of which is subsequently lowpass filtered to remove harmonics of the sampling clock, upconverted to RF, amplified using a PA, and delivered to the transmit antenna. This involves the DAC 158, upconverter 156 and PA 154 in the system of FIG. 2, and the DAC 258, upconverter 256 and PA 254 in the system of FIG. 3.

Figure 6:
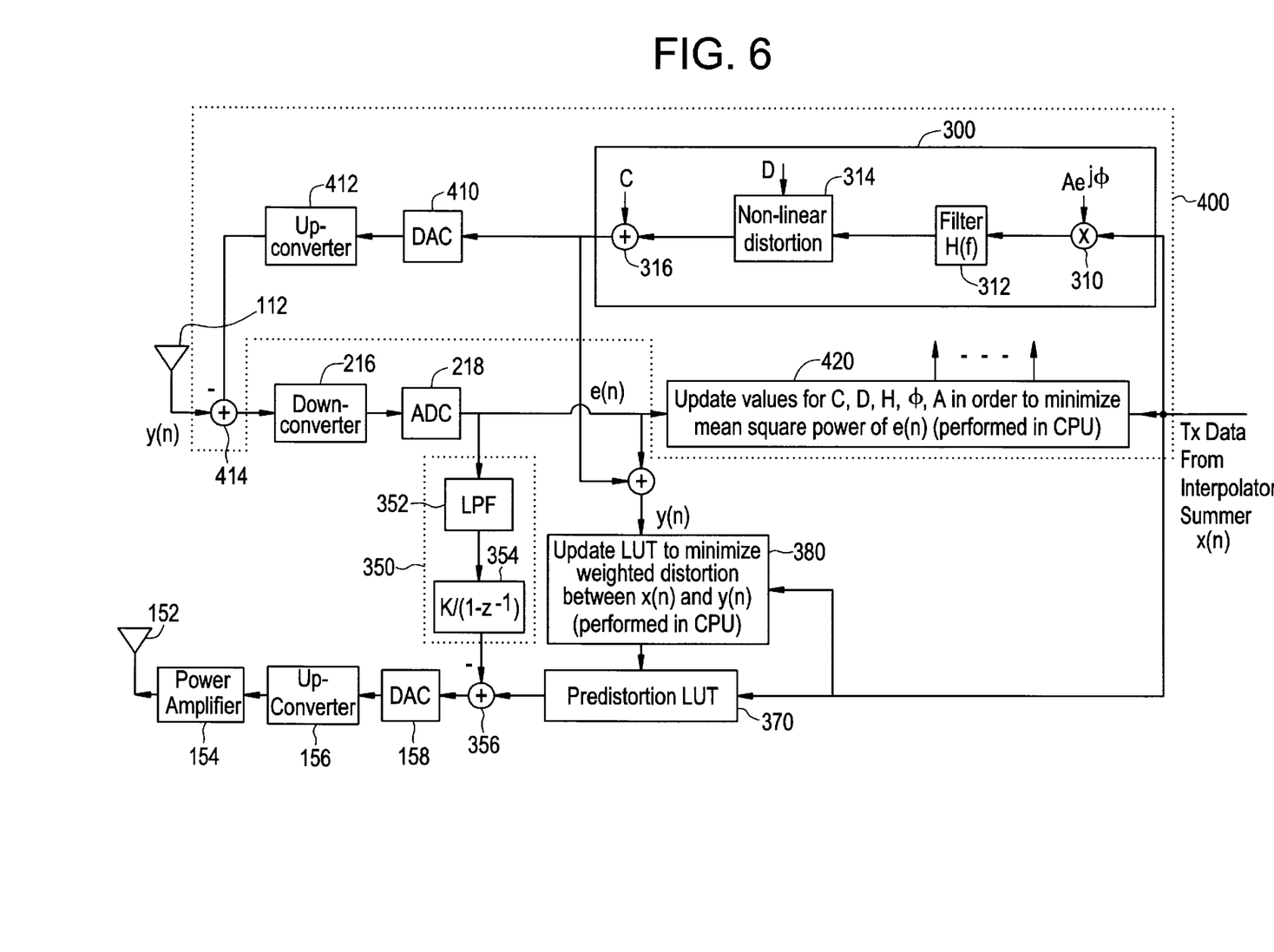
FIG. 6 is a block diagram showing a transmit interference canceller, power amplifier predistorter and other specific features useful in a wideband transceiver.

Turning to FIG. 6, several optional enhancements to the wideband systems will be described. First, the transmit carrier suppressor 350 is shown coupled between the output of the ADC 218 in the receiver signal path and the DAC 218 in the transmit signal path. (The transmit carrier suppressor 350 is useful in the system of FIG. 3 as shown, but parts of the configuration of FIG. 2 are used in FIG. 6 simply for purposes of explanation.) The transmit carrier suppressor 350 comprises a lowpass filter (LPF) 352 and an accumulator 354. The transmit carrier suppressor minimizes the carrier leakage caused by both DC offset in the transmit DAC and imperfections in the transmit upconverter. In operation, whenever the transmit PA is enabled, the signal received from the ADC in the receive antenna path is lowpass filtered by the LPF 352 and applied to the accumulator 354. The accumulator 354 has a large time constant relative to a packet duration. The accumulator output is negated and summed at the input to the transmit DAC by an adder 356 to minimize carrier leakage.

It is important to note that for the above algorithm to operate properly (1) the local oscillators for the upconverters and downconverters in the transmit and receive paths should be derived from a common frequency reference, and (2) the DC offset in the receive ADC be accounted for and subtracted from the ADC output before processing the receive samples in the manner described above. The receive DC offset may be estimated by configuring the receiver for minimum gain, disabling the transmitter, and computing the average ADC reading over an appropriately sized block of samples.

In most WLAN applications, the transmitter and receiver operate in the same frequency band, and time-division duplexing (TDD) is used to support full-duplex communication. A complication arises in wideband implementations of WLAN systems when it is required to transmit a signal at the same time that a signal of the same or another protocol is required to be received. Since in a wideband system there is no narrowband filtering to protect the receiver in this situation, some of the energy from the transmit signal is coupled into the receive path, and imposes a limitation on the useable dynamic range of the receiver.

For example, consider the case for a multi-protocol WLAN/WPAN hub node with a simultaneous Bluetooth transmission and an 802.11 reception. Assume that the Bluetooth signal is transmitted at a +20 dBm power level from the transmit antenna, and that the return loss between the transmit and receive antenna is 20 dB. Under these conditions, the coupled transmit signal is 0 dBm at the receive antenna. If the received 802.11 signal is relatively weak, i.e., near sensitivity at −85 dBm, then a receiver dynamic range of at least 85 dB would be required to avoid saturating the receiver and reliably accommodate both the coupled Bluetooth transmit signal and received 802.11 signal. An 85 dB dynamic range requirement is difficult to achieve using modern receiver technology, and would result in an expensive ADC.

Polarization may be used as a means to reduce the transmit energy that is coupled into the receive path. WLAN communications systems typically use linear polarization, which allows for an inexpensive monopole or whip antenna implementation at both the transmitting and receiving stations. By adjusting the orientation of the receive antenna relative to the transmit antenna, the gain of each antenna in the direction of the other may be reduced causing a corresponding reduction in the transmit power that is coupled into the receive antenna.

The transmit interference canceller shown at reference numeral 400 in FIG. 6 provides an additional means for suppression. The transmit interference canceller 400 comprises a coupled signal path estimator 300, a secondary DAC 410, an upconverter 412 and a summer 414. The coupled signal path is a path between the input to the DAC (such as DAC 158) in the transmit signal path and the input to downconverter (such as downconverter 216) in the receive signal path. The coupled signal path estimator 300 receives as input the signal x(n), which is the output of the summer 164 or 262 and generates a digital signal that, at baseband, represents the transmit signal adjusted for effects caused by passing it through the coupled signal path. The signal x(n) is a complex signal. The coupled signal path estimator includes a multiplier 310, a filter 312, a non-linear distortion element 314 and an adder 316. The multiplier 310 multiplies x(n) by a function $Ae^{j\phi}$. The values of A and $\phi$ represent the (frequency non-selective) amplitude and phase effects, respectively, on the coupled transmit signal. The filter 312 filters the output signal of the multiplier 310 in accordance with a transfer function H(f) that models and reproduces frequency distortion introduced into the band of interest by the coupled signal path described above. The non-linear distortion element 314 operates on the output of the filter 312 and introduces non-linear distortion by a function D that models non-linear distortion caused by amplifiers in the receive signal and transmit signal paths. The non-linear function D maps, in a non-linear fashion, an input voltage sample to an voltage sample. Finally, the complex additive constant C models DC offset as a result of carrier feedthrough in the transmit path, and is added to the output of the element 314 by the adder 316.

The parameters A, $\phi$, H(f), D and C are generated in a CPU (shown by block 420 in FIG. 6) using an iterative algorithm, such as a mean square algorithm, to minimize the energy of the error signal that is digitized at the ADC 116 or 220 in the receive signal path section and contained in the output signal of the ADC, that is identified as e(n). The CPU passes the updated parameters to the individual processes of the coupled signal path estimator 300 to re-shape the signal coupled to the secondary DAC 410 and the upconverter 412. The output at the adder 316 of the coupled signal path estimator 300 is a digital signal that represents, at baseband, the transmit signal coupled to the receive signal path, adjusted for phase, amplitude, frequency distortion, non-linear distortion and carrier leakage/DC offset associated with the coupled signal path identified above.

The transmit interference canceller 400 subtracts a replica of the reflected transmit signal from the receive signal path at the input to the receiver. The secondary DAC 412 and upconverter 414 convert the output of the coupled signal path estimator to an analog signal at the appropriate RF frequency, thereby synthesizing the replica signal of the reflected transmit signal. The output of the upconverter 414 is subtracted at RF from the receive signal by the summer 414 in order to suppress the reflected transmit signal in the received signal.

In an alternative embodiment of the transmit interference canceller, the summer 414 is coupled between the downconverter 216 and the ADC 218 to subtract the analog estimate signal from the analog signal that is input to the ADC 218. The upconverter 412 is not present in this form of the transmit interference canceller. Thus, the subtraction occurs of a replica signal at baseband, rather than at RF, and occurs before the ADC conversion, which is desirable.

A wideband system using a high-speed DAC to synthesize multiple transmit carriers is particularly sensitive to non-linear distortion generated by the transmit PA. Left uncorrected, the mixing products generated by this type of distortion produces an unacceptably high level of out-of-band interference. Several well-known algorithms may be used to minimize this type of distortion. The simplest approach is the deployment of a highly linear PA. However, this approach is often considerably more costly in terms of price and/or current consumption. Another well-known approach used in cellular telephony is the so-called Cartesian feedback algorithm, in which a quadrature downconverter is used to monitor the output of the PA and to shape the transmit signal in order to minimize the distortion between the downconverter output and the transmitters baseband input. A disadvantage of this approach is the added cost and size of the additional receiver required to monitor the transmit path.

The PA linearization process according to the present invention does not require an additional receiver since, in the wideband system shown in FIGS. 2 and 3, the transmitter and receiver operate in the same frequency band. FIG. 6 illustrates the approach in more detail. The PA predistorter 370 comprises a predistortion look up table (LUT) and the PA linearizer 380 comprises a weighting update process performed, for example, by a CPU.

The sampled waveform x(n) from the summer following the transmit interpolators/upconverters (160 or 258) is passed through the predistortion LUT 370 which predistorts x(n) in order to compensate for nonlinear distortion generated by the PA. The output of the coupled signal path estimator 300 is added to the ADC output e(n) of the receive signal path section, in order to reconstruct the receive antenna output signal, y(n). The CPU that generates the weights periodically obtains a buffered snapshot of both x(n) and y(n), and updates the contents of the LUT in order to minimize the weighted mean-square distortion between the signals x(n) and y(n). The weighting function is used to ensure that the distortion is computed only over frequency bands in which there is an active transmission. That is, the CPU generates values for the LUT which are weighted so as to provide distortion adjustment across a spectrum only where energy associated when a transmitted signal exists. The output of the predistortion LUT is a distortion adjusted signal that is supplied to the DAC in the transmit signal path section through an adder 356 if the transmit carrier suppressor 350 is employed.

Conventional narrowband techniques typically use an agile synthesizer to convert a portion of the RF band to a desired IF frequency band on the receive signal path. An agile synthesizer is also typically used to convert a narrowband baseband signal to the desired transmit frequency. A single synthesizer may be used for systems that operate in a time-division multiple-access (TDMA) manner when the transmit and receive slots are non-overlapping in time. A single synthesizer may also be used for different communications systems that do not operate simultaneously.

The wideband radio transceiver system architecture of the present invention converts the entire frequency band from baseband to RF for transmission, and from RF to baseband for reception, without regard to the location of one or more individual channels within the RF band. This wideband approach enables a single synthesizer to be used to simultaneously support multiple channels from a single WLAN technology or multiple channels from different WLAN technologies. A wideband approach also removes the requirement for synthesizer frequency agility, which typically allows for a less expensive synthesizer implementation.

Thus, the architecture of the wideband transceiver of the present invention is suitable for receiving and transmitting information in multiple protocol standards that overlap in bandwidth at any possible instant of time. An example of such a situation is shown in FIG. 4 in which during some time interval, energy in the bandwidth of interest may be present from 802.11b, Bluetooth, and/or HomeRF carriers. Moreover, the HomeRF and Bluetooth carriers may be hopping in and out of the 802.11b band. The wideband radio architecture described herein is useful in an hub node for two-way communication with several terminal devices that operate on multiple and different protocol standards, or in a terminal device.

The present invention has been described primarily with reference to WLANs, and short-range operation in an unlicensed band, but is not limited to use in only those environments. The radio transceiver system architecture and processing techniques described herein are useful in other wireless communication networks that operate in licensed bands and over greater distances.

The above description is intended by way of example only.

What is claimed is:

1. A wideband radio transceiver system for full-duplex communication of signals associated with one or more wireless communication protocols operating in a common frequency band, the system comprising:
   at least one receive signal path section for connection to a receive antenna, the receive signal path section comprising:
      a downconverter coupled to the receive antenna that downconverts a signal detected by the receive antenna representing a spectrum of said frequency band to an intermediate frequency signal;

an analog-to-digital converter (ADC) coupled to the downconverter that converts the intermediate frequency signal to a digital intermediate frequency signal;

a downconverter bank including one or more downconverters coupled to the ADC, each downconverter associated with a communication protocol, which downconverts the digital intermediate frequency signal to generate a baseband signal for each communication protocol;

a decimator bank including one or more decimators coupled the bank of downconverters, each decimator associated wit a corresponding communication protocol, and which decimates a corresponding baseband signal to a convenient sampling rate for a corresponding communication protocol to generate a complex baseband signal for each communication protocol;

a detector bank including one more detectors coupled to the bank of decimators, each detector associated with a corresponding communication protocol, and which demodulates a corresponding complex baseband signal to recover data therefrom;

a transmit signal path section coupled to a transmit antenna, the transmit signal path section comprising:

a modulator bank including one or more modulators, associated with a corresponding communication protocol, coupled to receive data to be transmitted using the communication protocol, each modulator generating a complex baseband signal corresponding to a communication protocol;

an interpolator bank including one or more interpolators coupled to the bank of modulators, each interpolator associated with a corresponding communication protocol and which increases a sampling rate of a corresponding complex baseband signal;

an upconverter bank including one or more upconverters, coupled to the bank of interpolators, each upconverter associated with a corresponding communication protocol and which upconverts an output of a corresponding interpolator to generate an intermediate frequency signal having a desired offset position in the frequency band;

a summer coupled to the output of the upconverter bank to sum each intermediate frequency signal output by the upconverter bank to generate a composite intermediate frequency signal;

a digital-to-analog converter coupled to the summer that converts the composite intermediate frequency signal to a composite analog signal;

an upconverter coupled to the digital-to-analog converter that upconverts the composite analog signal to a frequency range of the frequency band to generate a composite transmit signal;

a power amplifier coupled between the upconverter and the transmit antenna to amplify the composite transmit signal and couple the composite transmit signal to the transmit antenna for transmission;

wherein the receive signal path section and the transmit signal path section are operable to simultaneously process at least one receive signal and at least one transmit signal associated with one or more communication protocols in the frequency band.

2. The system of claim 1, and further comprising two receive antennas that are physically separated to enable the benefits of spatial diversity under Rayleigh fading conditions to be achieved, and a receive signal path section associated with each receive antenna.

3. The system of claim 1, wherein the downconverter bank, the decimator bank and the detector bank of the receive signal path section, and the modulator bank, the interpolator bank, the upconverter bank and the summer of the transmit signal path section are implemented by one or more digital application specific and/or general purpose processors that execute firmware or software, respectively, to process signals as required by each communication protocol.

4. The system of claim 1, and further comprising a control processor coupled to one or more components in the receive signal path section and the transmit signal path section, wherein the control processor supplies operating frequency information to the downconverter bank of the receive signal path section to control an operating frequency of at least one downconverter in the downconverter bank to coincide with changes to the carrier frequency of a communication protocol signal.

5. The system of claim 4, wherein the control processor supplies operating frequency information to the upconverter bank of the transmit signal path section to control an operating frequency of at least one upconverter in the upconverter bank to coincide with changes to the carrier frequency of a communication protocol.

6. The system of claim 4, wherein the downconverter bank, the decimator bank, the detector bank, the interpolator bank, the upconverter bank and the modulator bank are each capable of processing of signals according to one or more of the Bluetooth™ communication protocol and versions thereof, the IEEE 802.11 communication protocol and versions thereof, and the HomeRF communication protocol and versions thereof.

7. The system of claim 1, wherein the downconverter in the receive signal path section comprises a zero-IF quadrature downconverter and a lowpass filter.

8. The system of claim 7, wherein the analog-to-digital converter is a dual channel analog-to-digital converter that generates at least 80 million complex samples per second.

9. The system of claim 1, wherein the downconverter in the receive signal path comprises a real downconverter that converts to a non-zero intermediate frequency of at least 40 MHz.

10. The system of claim 9, wherein the analog-to-digital converter in the receive signal path section comprises a single channel analog-to-digital converter operating at a sampling rate of at least 160 MHz.

11. The system of claim 1, and further comprising a transmit interference canceller coupled between the summer after the output of the upconverter bank and an output of the receive antenna, the transmit interference canceller comprising:

a coupled signal path estimator coupled to receive as input the composite intermediate frequency signal output by the summer, the coupled signal path estimator comprising one or more of the following elements to operate on the composite intermediate frequency signal: a multiplier for multiplying the composite intermediate frequency signal by phase and attenuation factors, a filter having a filter function, a non-linear distortion processing element having a non-linear distortion function, and an adder for adding a complex additive constant, wherein values for the phase and attenuation factors, the filter function, the non-linear distortion function and the complex additive constant being generated using an iterative algorithm to minimize an error signal that is digitized by the analog-to-digital converter in the receive signal path section, and to produce as output a digital signal that represents, at baseband, a transmit signal coupled to the receive signal path, adjusted for one or more of phase, amplitude, frequency distortion, non-linear distortion and carrier leakage/DC offset associated with the coupled signal path;

a digital-to-analog converter coupled to the output of the coupled signal path estimator to convert the output thereof to an analog signal;

an upconverter coupled to the output of the digital-to-analog converter to upconvert the analog signal to a radio frequency of the receive signal thereby producing a signal that is a replica of the reflected transmit signal; and an adder coupled between the output of the receive antenna and an input to the downconverter in the receive signal path section to subtract the signal output by the upconverter from energy detected by the receive antenna, thereby suppressing the transmit signal that is being transmitted at the same time the receive signal path section is processing one or more receive signals.

12. The system of claim 11, and further comprising a processor coupled to receive the error signal and the composite intermediate frequency signal, and generating values for the phase and attenuation factors, the filter function, the non-linear distortion function and the complex added constant.

13. The system of claim 1, and further comprising a transmit interference canceller coupled between the summer after the output of the upconverter bank and an output of the receive antenna, the transmit interference canceller comprising:

a coupled signal path estimator coupled to receive as input the composite intermediate frequency signal output by the summer, the coupled signal path estimator comprising one or more of the following elements to operate on the composite intermediate frequency signal: a multiplier for multiplying the composite intermediate frequency signal by phase and attenuation factors, a filter having a filter function, a non-linear distortion processing element having a non-linear distortion function, and an adder for adding a complex additive constant, wherein values for the phase and attenuation factors, the filter function, the non-linear distortion function and the complex additive constant being generated using an iterative algorithm to minimize an error signal that is digitized by the analog-to-digital converter in the receive signal path section, and to produce as output a digital signal that represents, at baseband, a transmit signal coupled to the receive signal path, adjusted for one or more of phase, amplitude, frequency distortion, non-linear distortion and carrier leakage/DC offset associated with the coupled signal path;

a digital-to-analog converter coupled to the output of the coupled signal path estimator to convert the output thereof to an analog signal; and an adder coupled between the output of the downconverter and the input to the analog-to-digital converter in the receive signal path section to subtract the analog signal output by the digital-to-analog converter of the transmit interference canceller from the output of the downconverter, thereby suppressing the transmit signal that is being transmitted at the same time the receive signal path section is processing one or more receive signals.

14. The system of claim 1, and further comprising:

a coupled signal path estimator coupled to receive as input the composite intermediate frequency signal output by the summer, the coupled signal path estimator comprising one or more of the following elements to operate on the composite intermediate frequency signal: a multiplier for multiplying the composite intermediate frequency signal by phase and attenuation factors, a filter having a filter function, a non-linear distortion processing element having a non-linear distortion function, and an adder for adding a complex additive constant, values for the phase and attenuation factors, the filter function, the non-linear distortion function and the complex additive constant being generated using an iterative algorithm to minimize an error signal that is digitized by the analog-to-digital converter in the receive signal path section;

a predistortion look up table that stores values to predistort the composite intermediate frequency signal output by the summer in order to compensate for non-linear distortion generated by the power amplifier in the transmit signal path section, values for the predistortion look up table being generated to minimize a weighted mean-square distortion between the composite intermediate frequency signal and a signal which is the sum of the output of the coupled signal path estimator and the output of the analog-to-digital converter in the receive signal path section.

15. The system of claim 14, and further comprising a processor coupled to receive the signal which is the sum of the output of the coupled signal path estimator and the output of the analog-to-digital converter in the receive signal path section, and the composite intermediate frequency signal to generate values for the predistortion look up table.

16. The system of claim 15, wherein the processor generates values which are weighted so as to provide distortion adjustment across a spectrum only where energy associated when a transmitted signal exists.

17. The system of claim 1, wherein the receive signal path section processes energy detected by the receive antenna in the frequency band simultaneously with the transmit signal path section processing signals that are transmitted in the frequency band.

18. The system of claim 1, and further comprising a transmit carrier suppressor comprising a low pass filter coupled to the output of the analog-to-digital converter in the receive signal path section and an accumulator coupled to the output of the low pass filter, the accumulator having a large time constant relative to a transmit packet duration so as to suppress leakage of energy associated with a transmit carrier, wherein an output of the accumulator is subtracted from the composite intermediate frequency signal before input to the digital-to-analog converter in the transmit signal path section.

19. The system of claim 1, wherein the downconverter bank, the decimator bank and the detector bank of the receive signal path section, and the modulator bank, the interpolator bank, the upconverter bank and the summer of the transmit signal path section comprise a sufficient number of elements to process signals associated with two or more communication protocols in the frequency band.

20. The system of claim 1, wherein the receive antenna and the transmit antenna are spatially separated a sufficient distance from each other to suppress coupling of a transmit signal into the receive signal path section.

21. A method for full-duplex communication of signals associated with one or more wireless communication protocols operating in a common frequency band, comprising steps of:
  downconverting energy detected by a receive antenna representing a spectrum of energy in substantially all of said frequency band to an intermediate frequency signal;
  converting the intermediate frequency signal to a digital intermediate frequency signal;
  for each of one or more communication protocols, downconverting the digital intermediate frequency signal to generate a baseband signal associated with each communication protocol;
  decimating each baseband signal to a convenient sampling rate for a corresponding communication protocol to generate a plurality of complex baseband signals;
  demodulating each complex baseband signal to recover data contained therein;
  modulating data to be transmitted using the plurality of communication protocols to generate a complex baseband signal for each communication protocol;
  increasing a sampling rate of each complex baseband signal to a sampling rate convenient for each communication protocol thereby producing an up-sampled signal for each communication protocol;
  upconverting each up-sampled to an intermediate frequency signal having a desired offset position in the frequency band;
  adding together each intermediate frequency signal to produce a composite intermediate frequency signal;
  converting the composite intermediate frequency signal to a composite analog signal;
  upconverting the composite analog signal to a frequency range of the frequency band to produce a composite transmit signal.

22. The method of claim 21, and further comprising steps of:
  processing the composite intermediate frequency signal to adjust for one or more of phase distortion, amplitude distortion, frequency distortion, non-linear distortion, and carrier leakage/DC offset associated with a coupled signal path of the transmit signal to the receive antenna to produce a digital signal that represents, at baseband, the transmit signal as affected by the coupled signal path;
  converting the digital signal to an analog signal;
  upconverting the analog signal to a radio frequency to produce a signal that is a replica of the reflected transmit signal from the receive signal path; and
  subtracting the replica signal from the energy detected by the receive antenna thereby suppressing the transmit signal that is being transmitted at the same time one or more receive signals are being processed.

23. The method of claim 22, wherein the step of processing the composite intermediate frequency signal comprises generating values for the phase distortion, amplitude distortion, frequency distortion, non-linear distortion, and carrier leakage/DC offset using an iterative algorithm to minimize an error signal that is derived from the digital intermediate frequency signal.

24. The method of claim 21, and further comprising steps of:
  processing the composite intermediate frequency signal to adjust for one or more of phase distortion, amplitude distortion, frequency distortion, non-linear distortion, and carrier leakage/DC offset associated with a coupled signal path of the transmit signal to the receive antenna to produce a digital signal that represents, at baseband, the transmit signal as affected by the coupled signal path;
  converting the digital signal to an analog signal;
  subtracting the analog signal from the digital intermediate frequency signal thereby suppressing the transmit signal that is being transmitted at the same time one or more receive signals are being processed.

25. The method of claim 21, and further comprising steps of:
  processing the composite intermediate frequency signal to adjust for one or more of phase, attenuation, non-linear distortion, and carrier leakage/DC offset associated with a coupled signal path of the transmit signal to the receive antenna to produce a digital signal that represents, at baseband, the transmit signal as affected by the coupled signal path;
  storing in a predistortion look up table values to predistort the composite intermediate frequency signal in order to compensate for non-linear distortion generated by a power amplifier used for transmitting the composite transmit signal; and
  generating the values for the predistortion look up table to minimize a weighted mean-square distortion between the composite intermediate frequency signal and a signal which is the sum of the digital signal that represents, at baseband, the transmit signal as affected by the coupled signal path and the digital intermediate frequency signal.

26. The method of claim 25, wherein the step of generating values comprises weighting the values so as to provide distortion adjustment across a spectrum only where energy associated when a transmitted signal exists.

27. A software product stored on a processor readable memory containing instructions that, when executed by a processor, causes the processor to perform steps of:
  for each of a plurality of communication protocols, downconverting a digital intermediate frequency signal derived from energy detected by a receive antenna representing a spectrum of a frequency band to generate a baseband signal associated with each communication protocol;
  decimating each baseband signal to a convenient sampling rate for a corresponding communication protocol to generate a plurality of complex baseband signals;
  demodulating each complex baseband signal to recover data contained therein;
  modulating data to be transmitted using the plurality of communication protocols to generate a complex baseband signal for each communication protocol;
  increasing a sampling rate of each complex baseband signal to a sampling rate convenient for each communication protocol thereby producing an up-sampled signal for each communication protocol;
  upconverting each up-sampled to an intermediate frequency signal having a desired offset position in the frequency band; and
  adding together each intermediate frequency signal to produce a composite intermediate frequency signal that can be converted to an analog signal and upconverted to a radio frequency for transmission.

28. A predistorter useful to predistort a signal representing information to be transmitted by a communication device having a transmitter and a receiver, the transmitter having a power amplifier, the predistorter comprising:

a coupled signal path estimator coupled to receive as input an intermediate frequency signal representing information to be transmitted, the coupled signal path estimator comprising one or more of to following elements to operate on the intermediate frequency signal: a multiplier for multiplying the intermediate frequency signal by phase and attenuation factors, a filter having a filter function, a non-linear distortion processing element having a non-linear distortion function, and an adder for adding a complex additive constant, wherein values for the phase and attenuation factors, the filter function, the non-linear distortion function and the complex additive constant being generated to adjust the intermediate frequency signal for effects caused by a coupled signal path between components in the transmitter, an air-interface between the transmitter and receiver, and components in the receiver; and a predistortion look up table that stores values to predistort the intermediate frequency signal in order to compensate for non-linear distortion generated by the power amplifier in the transmit signal path section, values for the predistortion look up table being generated to minimize a weighted mean-square distortion between the intermediate frequency signal and a signal which is the sum of the output of the coupled signal path estimator and an intermediate frequency signal in the receiver derived from a received signal.

29. The predistorter of claim 28, and further comprising a processor that generates values for the look up table which are weighted so as to provide distortion adjustment across a spectrum only where energy associated when a transmitted signal exists.

* * * * *

UNITED STATES PATENT AND TRADEMARK OFFICE
CERTIFICATE OF CORRECTION

PATENT NO.    : 6,526,264 B2
DATED         : February 25, 2003
INVENTOR(S)   : Gary L. Sugar and William R. Seed It is certified that error appears in the above-identified patent and that said Letters Patent is hereby corrected as shown below:

<u>Title page,</u>
Item [56], References Cited, U.S. PATENT DOCUMENTS, the following additional U.S. Patents should be listed:
-- 6,276,697 B1   08-21-2001   Brody et al. --
-- 6,173,189 B1   01/09-2001   Lockhart --
-- 6,236,674 B1   05/22/2001   Morelli et al. --
-- 5,937,341      08/10/1999   Suominen --
-- 5,909,463      06/01/1999   Johnson et al. --

Signed and Sealed this

Eighth Day of July, 2003

JAMES E. ROGAN
*Director of the United States Patent and Trademark Office*